United States Patent [19]

Wright et al.

[11] 4,207,051
[45] Jun. 10, 1980

[54] STRIPPER MECHANISM FOR INJECTION MOLD

[75] Inventors: John B. Wright, Bolton; Robert D. Schad, Schomberg, both of Canada

[73] Assignee: Husky Injection Molding Systems Limited, Bolton, Canada

[21] Appl. No.: 2,735

[22] Filed: Jan. 11, 1979

[51] Int. Cl.² .......................... B29C 7/00; B29F 1/14
[52] U.S. Cl. .................................... 425/556; 425/444; 425/441; 249/67; 425/438; 425/577
[58] Field of Search ................... 425/436 R, 441, 438, 425/444, 556, 557; 249/67, 68, 66 R

[56] References Cited

U.S. PATENT DOCUMENTS

| | | | |
|---|---|---|---|
| 2,404,631 | 7/1946 | Gronemeyer | 425/438 |
| 3,141,192 | 7/1964 | Benedetto | 425/595 X |
| 3,387,323 | 6/1968 | Wyllie et al. | 425/438 X |
| 3,453,353 | 7/1969 | Minneman | 425/441 X |
| 3,767,352 | 10/1973 | Rees | 425/441 |
| 3,807,915 | 4/1974 | Rees | 425/436 R |

FOREIGN PATENT DOCUMENTS 906164  8/1972  Canada ...................................... 425/441

Primary Examiner—J. Howard Flint, Jr.
Attorney, Agent, or Firm—Karl F. Ross

[57] ABSTRACT

An injection-molding machine has a fixed and a movable outer platen bracketing a movable intermediate platen, the latter having a runner system conducted via an extensible or flexible conduit to a source of molten plastic material to be injected into cavities defined by respective pairs of mold portions supported by the three platens, the cavities being formed in part by cores carried on the outer mold portions. A stripper plate inserted between each pair of mold portions is articulated via a spring-loaded lost-motion link to a respective eccentric pin on a pinion which is rotatably mounted on the intermediate platen and meshes with a pair of racks respectively secured to the two outer platens; this linkage is duplicated on opposite sides of the mold. In an initial phase of a mold-opening stroke, the stripper plates move outwardly under spring pressure while remaining in contact with their respective outer mold portions whose cores still retain the freshly molded articles. When the limit of the lost-motion travel is reached, the stripper plates are slowly lifted off their adjoining mold portions to detach the molded articles from the cores.

10 Claims, 6 Drawing Figures

STRIPPER MECHANISM FOR INJECTION MOLD

FIELD OF THE INVENTION

Our present invention relates to an injection-molding machine of the type wherein one or more generally cup-shaped articles, adhering to respective mold cores upon their extraction from associated cavities when the mold is opened, are detached from these cores by a stripper plate movable relatively to the core-bearing mold portion.

BACKGROUND OF THE INVENTION

Commonly owned U.S. Pat. Nos. 3,767,352 and 3,807,915 disclose injection-molding machines in which a stripper plate is sandwiched between coacting mold portions in a mold-closed position and during the mold-opening stroke is gradually separated from one of these mold portions by an articulated linkage connected with the relatively movable mold portions or their supporting platens. U.S. Pat. No. 3,767,352 also shows a stack mold with two pairs of coacting mold portions and two interposed stripper plates movable symmetrically on opposite sides of the intermediate mold portions.

OBJECTS OF THE INVENTION

The general object of our present invention is to provide a simplified ejection mechanism for the controlled displacement of a stripper plate during opening and closure of a mold.

A more specific object is to provide a mechanism of this type particularly designed for a stack mold, having the dual function of displacing the stripper plates and co-ordinating the movement of an intermediate platen with the relative motion of two outer platens by a reciprocating mold drive.

SUMMARY OF THE INVENTION

In accordance with our present invention, two relatively movable platens carrying respective mold portions are interconnected by a rack-and-pinion coupling whose pinion, rotatably journaled on one of these platens, is eccentrically articulated to a link forming a lost-motion connection with an interposed stripper plate which is urged by resilient means into contact with the mold portion on the last-mentioned platen at the beginning of a mold-opening stroke. The lost-motion connection allows such contact to be maintained in an initial phase of the mold-opening stroke, i.e. until the link comes into positive engagement with the stripper plate whereupon that contact is broken and the stripper plate begins to separate from the adjacent mold portion. If the angular displacement of the pinion is taken as a reference parameter, the movement of the other platen (secured to the rack) will be linear. Since the pivotal joint between the link and the pinion moves along an arcuate path, however, the plate-engaging end of that link carries out a simple harmonic motion while traveling always more slowly than that other platen as seen from the platen carrying the pinion, provided that the pivotal joint is disposed on the pinion inwardly of its toothed periphery. With proper choice of the position of that joint at the end of the lost-motion phase, the velocity difference between the remote link end and the other platen may be quite small at the instant of positive engagement of that end with the stripper plate so that separation will be gradual, avoiding any objectionable impact upon the freshly molded article or articles.

Thereafter, however, the stripper plate is quickly decelerated and may even reverse its movement relative to the pinion-carrying platen so that the molded article or articles are rapidly detached from their cores and dropped into a receptacle or onto a conveyor beneath the machine bed.

According to a more particular feature of our invention, the rack and the lost-motion connection are duplicated on opposite sides of the pinion-carrying platen for the control of two stripper plates in a stack mold of the general type referred to above. The racks, in that instance, are instrumental in maintaining the middle platen equispaced from the two outer platens throughout the cycle of reciprocation. Any one of these three platens could be stationary while another one is driven; in the embodiment more specifically described hereinafter, one of the two outer platens is fixed while the other outer platen is directly coupled to the reciprocating mold drive.

BRIEF DESCRIPTION OF THE DRAWING

The above and other features of our invention will now be described in detail with reference to the accompanying drawing in which.

SPECIFIC DESCRIPTION

Figure 1:
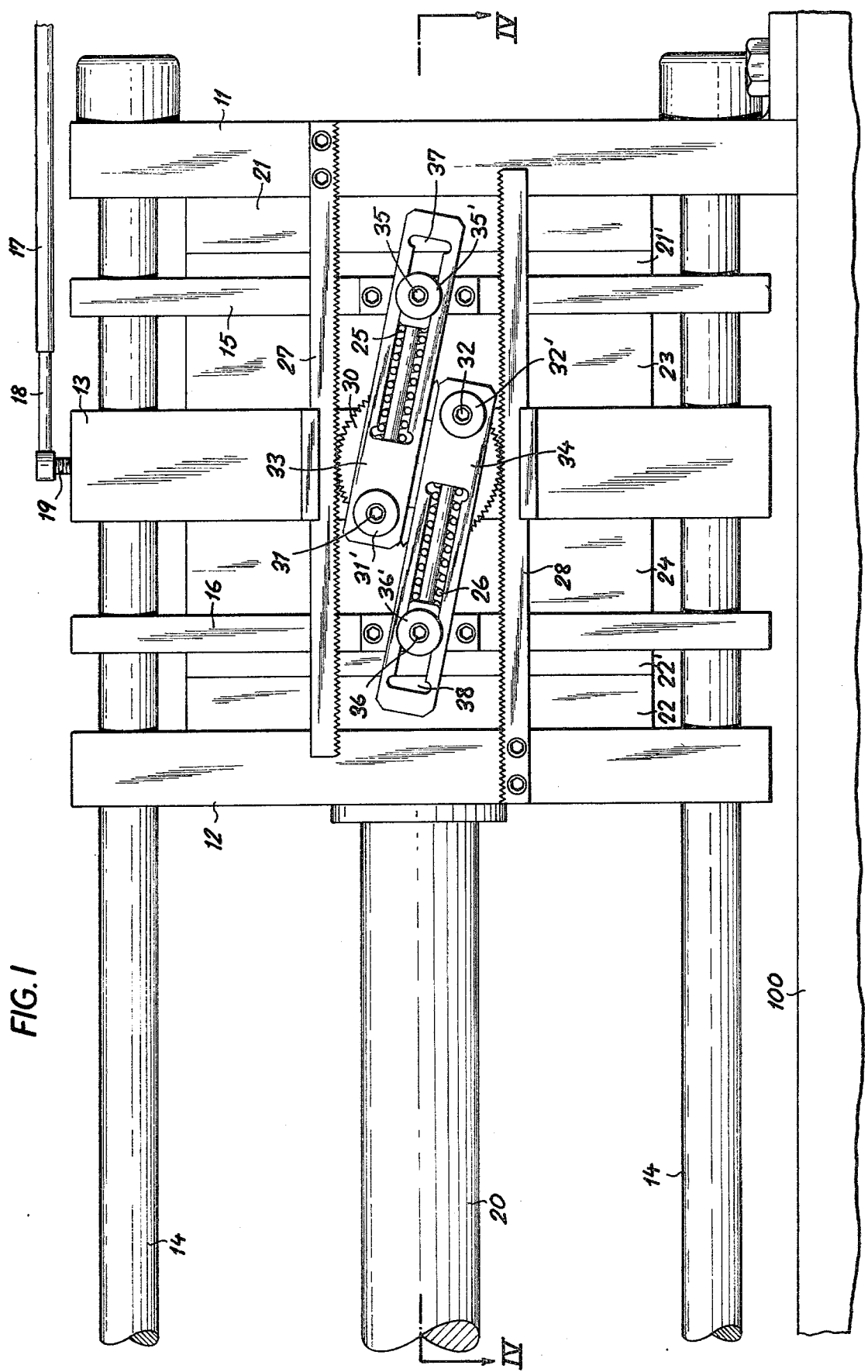
FIG. 1 is a side-elevational view of part of a molding machine according to our invention, including three relatively movable platens shown in their mold-closed position.
Figure 2:
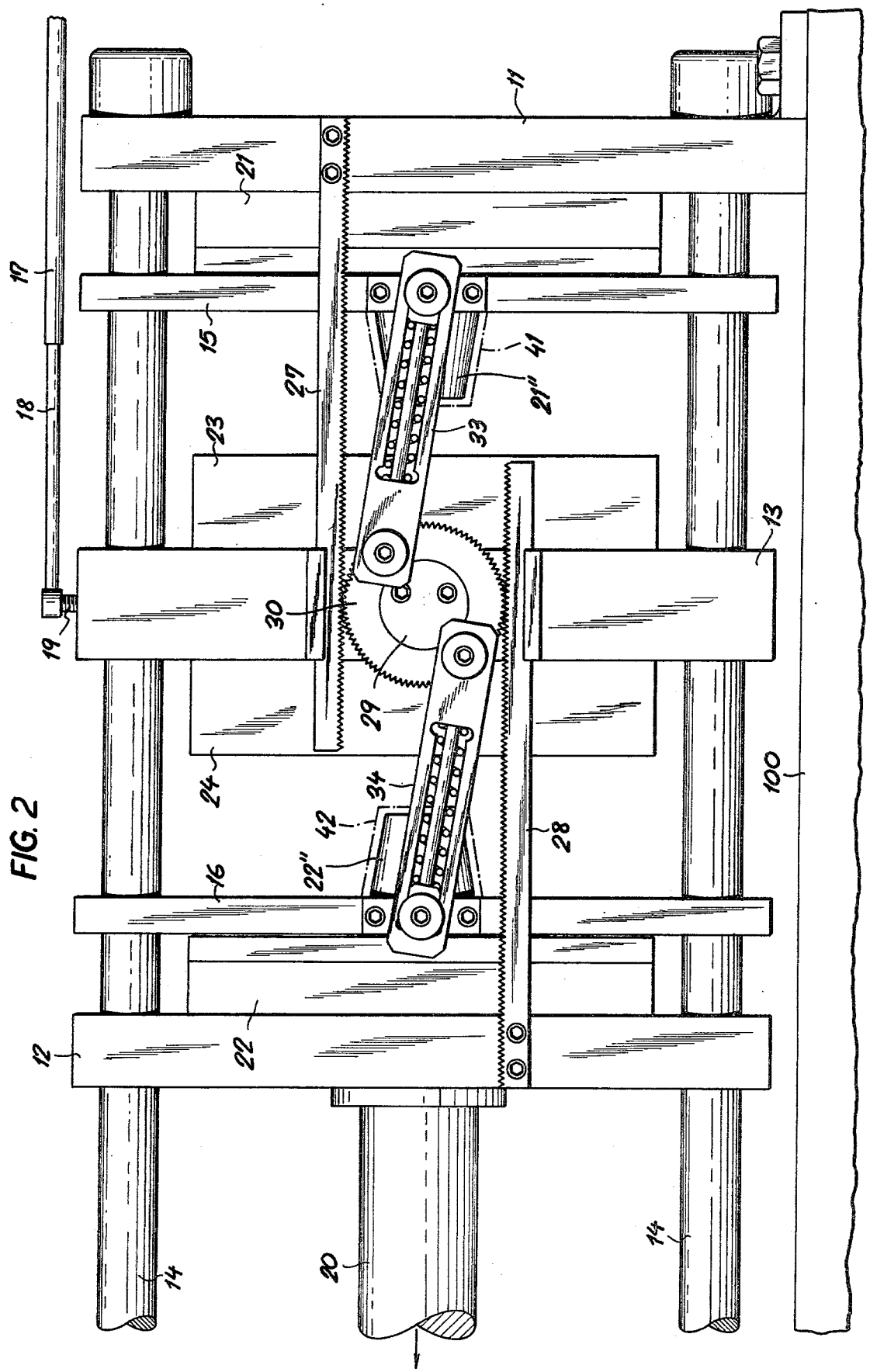
FIG. 2 is a view similar to FIG. 1 but showing the platens in the intermediate position of a mold-opening stroke.
Figure 3:
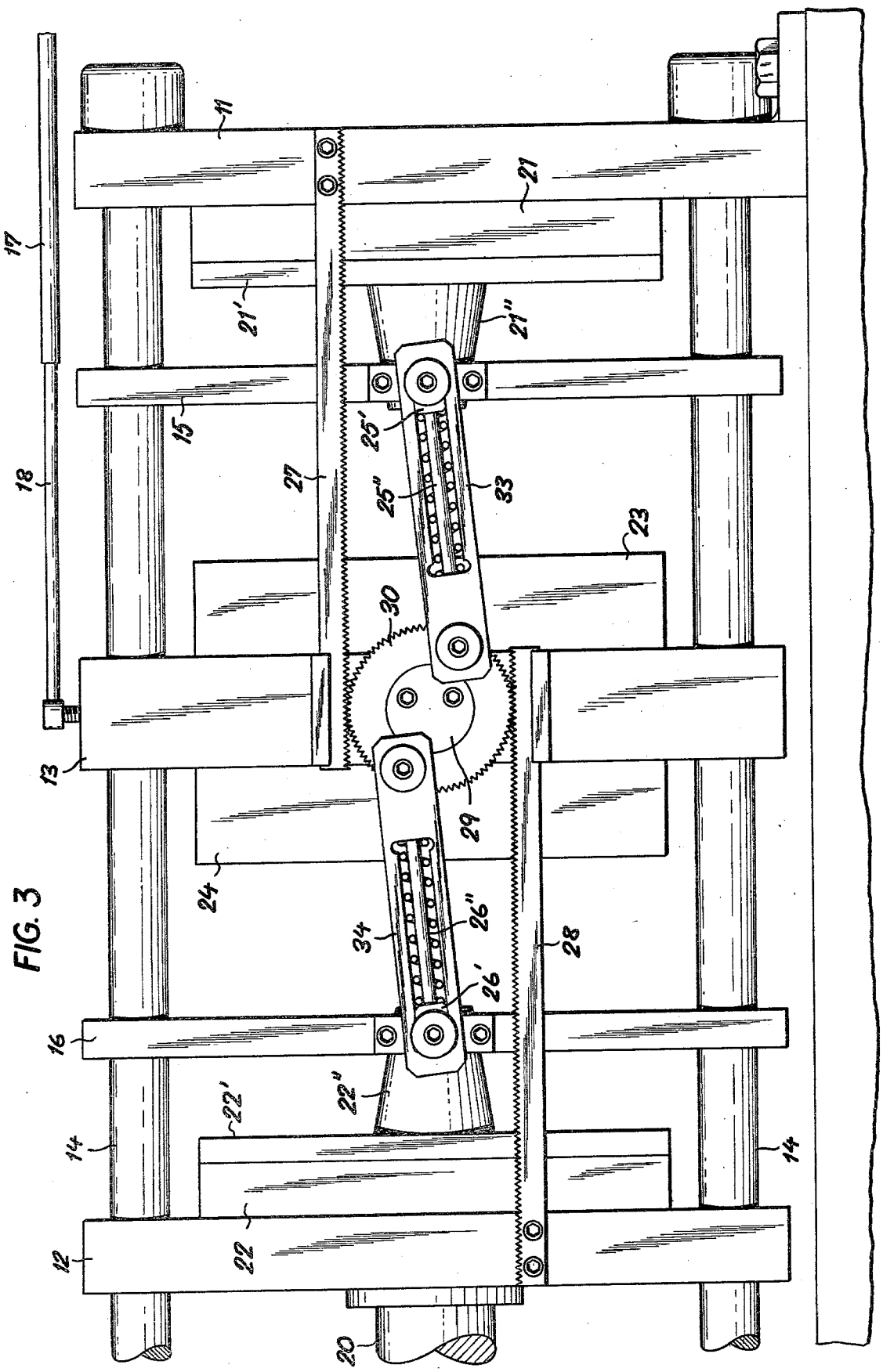
FIG. 3 is another view similar to FIG. 1, illustrating the mold-open position.

In FIGS. 1–4 we have shown part of an otherwise conventional injection-molding machine including a frame 100 to which a stationary platen 11 is fixed. Two other platens 12 and 13 are horizontally slidable on a set of tie bars 14 secured to platen 11 and to some other, nonillustrated part of the frame. Platen 12 is reciprocable by a conventional crank drive, including a ram 20, between a mold-closed position shown in FIG. 1 and a mold-open position shown in FIG. 3.

Figure 4:
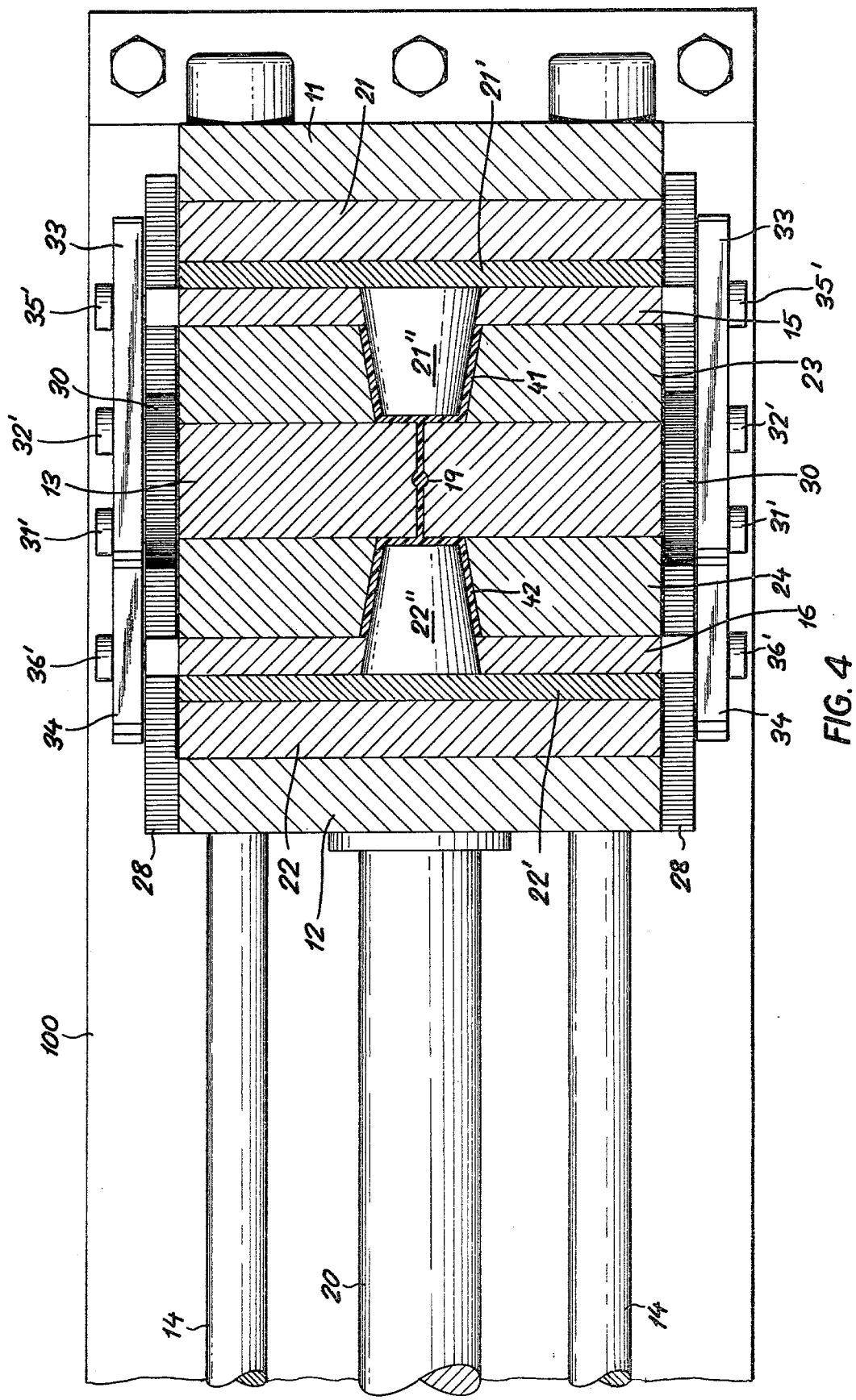
FIG. 4 is a cross-sectional view taken on the line IV—IV of FIG. 1.

Platens 11 and 12 carry respective mold portions 21 and 22 coacting with mold portions 23 and 24 on opposite sides of platen 13. The two outer mold portions 21 and 22 carry replaceable face plates 21' and 22' with frustoconical cores 21'', 22'' which are receivable in cavities of mold portions 23, 24 for the molding of cup-shaped workpieces 41, 42 as illustrated in FIG. 4. For this purpose, platen 13 is provided with a runner system including a central feed channel 19 through which liquefied plastic material can be injected from a nonillustrated pressure cylinder via an extensible conduit comprising two telescoped tubes 17, 18.

The freshly molded workpieces 41, 42 rest with their broad bases on respective stripper plates 15, 16 sandwiched in FIG. 1 between mold portions 21, 23 and 22, 24, respectively. When the mold is opened, these stripper plates initially remain in contact with the face plates 21', 22' of mold portions 21, 22 while the workpieces 41, 42 continue to harden; somewhere past the midpoint of the mold-opening stroke, i.e. in the position shown in FIG. 2, stripper plates 15 and 16 begin to separate from the adjacent mold portions to dislodge the workpieces 41, 42 from their cores 21", 22".

In accordance with our present invention, this motion of the stripper plates is brought about by a pair of racks 27, 28 in mesh with a pinion 30, the racks being respectively secured to platens 11, 12 whereas the pinion is freely rotatable about a hub 29 on platen 13. Stripper plates 15 and 16 are linked with pinion 30 by a pair of arms 33, 34 which are pivotally connected with pinion 30 by two diametrically opposite pins 31, 32 with retaining collars 31', 32', these arms being formed with longitudinal slots 37, 38 in which studs 35, 36 mounted on stripper plates 15 and 16 and provided with retaining collars 35', 36' are slidably received. The studs 35, 36 are urged outward by respective coil springs 25, 26 acting upon them through pressure pads 25', 26' with stems 25", 26" whose other extremities are guided in bores aligned with slots 37, 38.

As will be apparent from FIG. 4, the rack-and-pinion assembly 27–30 and the lost-motion connections 31–38 are duplicated on opposite sides of the stack mold and its supporting platens.

Figure 5:
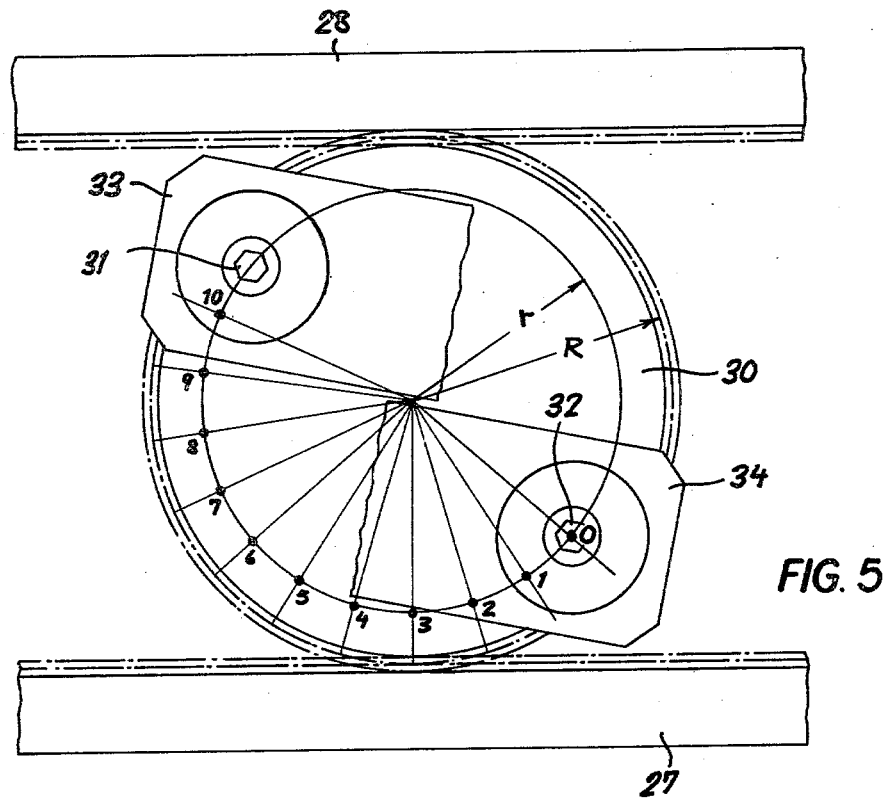
FIG. 5 is a diagrmmatic view of part of a rack-and-pinion mechanism included in the assembly of FIGS. 1–4, with the pinion drawn to a larger scale.

In FIG. 5 we have diagrammatically illustrated the pinion 30 and the racks 27, 28 on a larger scale. The two pivot pins 31, 32 are spaced from the pinion axis by a radius r which is smaller than the pitch radius R of the pinion. In FIGS. 1 and 5, these pivots are in their starting position designated 0 for pinion 32. In the course of a mold-opening stroke, each pivot pin travels over nearly a semicircle into a position shown at 10 for pin 32; intermediate positions have been designated 1–9. These positions have also been indicated along the ordinate of the diagram of FIG. 6 whose abscissa indicates the corresponding rack motion between the mold-closed and mold-open positions. Solid line A shows successive positions of mold portion 22 relative to mold portion 24 whose position is given by the vertical line C. Dotted curve B represents the positions of stripper plate 16 which in an initial phase of the mold-opening stroke coincide with those of mold portion 22. Mold portion 21 and stripper plate 15 carry out a symmetrical motion with reference to mold portion 23.

Figure 6:
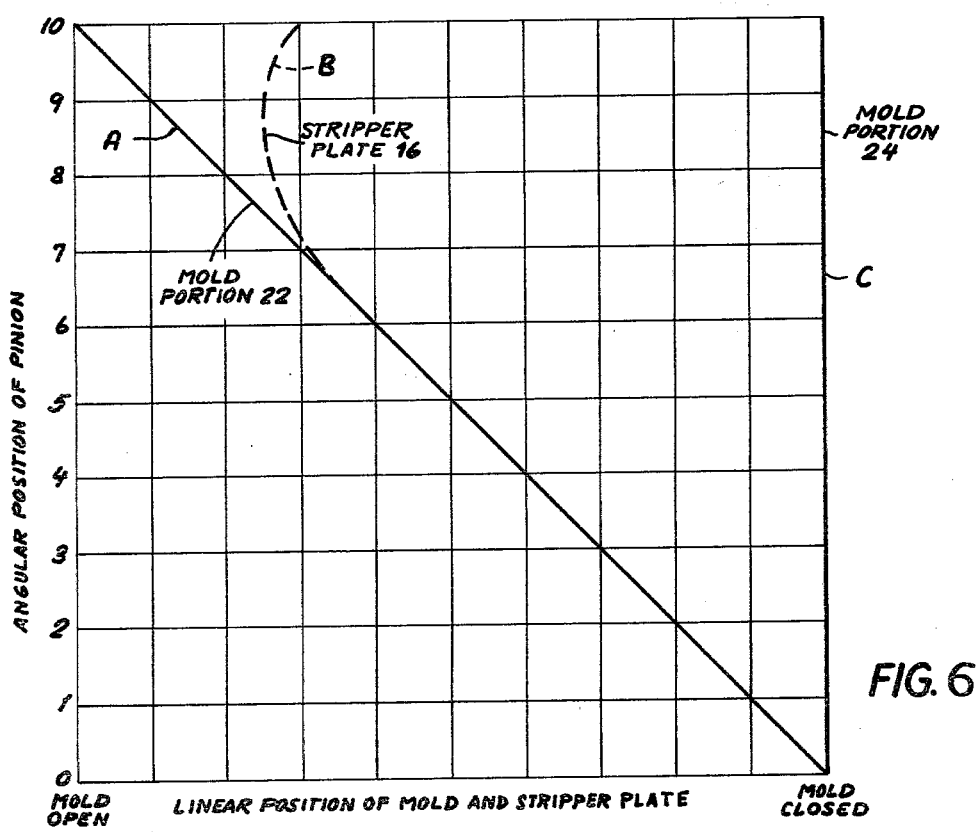
FIG. 6 is a graph showing the relative motions of two of the platens and of an interposed stripper plate.

In this specific example, with pin 32 starting from position 0 about midway in the lower right-hand quadrant of pinion 30, the horizontal velocity component of the pin approaches the speed of rack 27 in position 3 and then decreases with reference thereto so that the free end of arm 34 moves leftward at a speed less than that of platen 12 and mold portion 22. Spring 26, however, maintains the stripper plate 16 in contact with face plate 22' of mold portion 22 until the guide stud 36 reaches the end of slot 38. This occurs approximately in position 6 (corresponding to FIG. 2), about a quarter revolution of the pinion from position 0, whereupon line B curves away from line A as the stripper plate 16 separates from the adjoining mold portion. Such separation also takes place simultaneously, of course, between stripper plate 15 and mold portion 21. Between positions 8 and 9 there occurs a reversal of the velocities of the stripper plates relative to platen 13 which in the diagram of FIG. 6 is considered stationary. In the final position 10, illustrated in FIG. 3, the two stripper plates are well separated from the outer mold portions 21, 22 even though they are still closer to them than to the inner mold portions, 23, 24, thus leaving enough space for the ejection of the dislodged workpieces 41, 42.

The displacement of the movable platens 12, 13 and of the stripper plates 15, 16, also guided by the tie rods 14, is thus precisely co-ordinated by the rack-and-pinion assembly 27–30 and by the lost-motion linkages 31–38 according to our invention. During the mold-opening stroke, the two links 33, 34 advance codirectionally with the respective racks 27, 28 from starting position 0 to the dead-center point between positions 8 and 9, thus over the major part of the stroke. During mold closure, mold portion 22 and stripper plate 16 retrace the lines A and B in the reverse direction, again with codirectional motion over most of the stroke.

The relationship r<R, while convenient, is not essential in some circumstances. Thus, pivot pins 31 and 32 could be disposed on radially projecting lugs at locations beyond the pinion periphery as long as there is a point at which the links 33, 34 are slowed down sufficiently to come into positive engagement with the studs 35, 36 or equivalent abutments on the stripper plates. The separation of the stripper plates from the adjacent mold portions may therefore be made as gradual or as abrupt as desired and at any point of the mold-opening stroke, though we prefer the illustrated arrangement in which the initial phase (marked by the coincidence of lines A and B in FIG. 6) terminates in the second stroke half.

Obviously, the links 33, 34 could be inverted with interchange of their pivot pins 31, 32 and the spring-biased studs 35, 36.

The operation of the system would be analogous to that described if one of the two outer platens 11, 12 were omitted, one of the remaining platens being connected with ram 20 and the other being held stationary.

We claim:
1. In an injection-molding machine having a plurality of relatively movable platens including a first platen carrying a first mold portion and a second platen carrying a second mold portion, said first mold portion being provided with a projecting core receivable in a mold-closed position in a recess of said second mold portion for defining therewith an injection cavity, the combination therewith of a stripper plate penetrated by said core sandwiched between said first and second mold portions in said mold-closed position and mechanism for detaching said stripper plate from both said mold portions upon displacement of said platens into a mold-open position to disengage a molded workpiece from said core, said mechanism comprising:

a rack secured to said first platen and extending past said second platen in said mold-closed position;

a pinion rotatably journaled on said second platen in mesh with said rack;

resilient means urging said stripper plate into contact with said first mold portion at the beginning of a mold-opening stroke; and a link articulated at an eccentric location to said pinion and joined to said first platen by a lost-motion connection enabling limited separation of said stripper plate from said second mold portion whereby said stripper plate maintains contact with said first mold portion under the urging of said resilient means in an initial phase of said mold-opening stroke, said link coming into positive engagement with said stripper plate for breaking said contact at the end of said initial phase.

2. The combination defined in claim 1 wherein said resilient means comprises a spring anchored to said link and to a slider on said stripper plate guided in a slot of said link.

3. The combination defined in claim 1 or 2 wherein said eccentric location is so disposed on said pinion inwardly of the periphery thereof as to lie within an angle of less than 90° from the point of engagement of said pinion with said rack at the end of said initial phase whereby said link advances codirectionally with said rack, albeit at a lesser speed, during a further phase of said mold-opening stroke.

4. The combination defined in claim 3 wherein said lost-motion connection is dimensioned to establish said positive engagement in the second half of said mold-opening stroke.

5. The combination defined in claim 4 wherein the length of said mold-opening stroke is approximately half the circumference of said pinion, said eccentric location passing through a dead-center position near the end of said mold-opening stroke.

6. The combination defined in claim 1 or 2 wherein said pinion, said rack and said link are duplicated on opposite sides of said platens.

7. The combination defined in claim 1 wherein said platens include a third platen carrying a third mold portion confronting a fourth mold portion on a side of said second platen remote from said first platen; further comprising another rack in mesh with said pinion and secured to said third platen for displacing the latter symmetrically with said first platen relatively to said second platen, another stripper plate between said third and fourth mold portions penetrated by a core on said third mold portion, and another link articulated to said pinion at an eccentric location diametrically opposite the first-mentioned location, said other link being joined to said third platen by a lost-motion connection enabling limited separation of said other stripper plate from said second mold portion until the end of said initial phase whereupon said other link positively engages said other stripper plate for detaching the latter from said third mold portion, and other resilient means urging said other stripper plate into contact with said third mold portion in said initial phase.

8. The combination defined in claim 7 wherein said second platen is provided with injection means for feeding liquefied plastic material to cavities formed by said first and second mold portions and by said third and fourth mold portions.

9. The combination defined in claim 7 or 8 wherein said third platen is stationary and said first platen is provided with drive means for reciprocating same between said mold-closed and mold-open positions, with entrainment of said second platen by said racks and said pinion.

10. The combination defined in claim 7 or 8 wherein said stripper plates are provided with sliders guided in slots of the respective links, said resilient means comprising springs anchored to said links and to the associated sliders.

* * * * *